United States Patent [19]
Mikuni

[11] Patent Number: 5,353,406
[45] Date of Patent: Oct. 4, 1994

[54] IMAGE COMMUNICATION APPARATUS

[75] Inventor: Makoto Mikuni, Yokohama, Japan

[73] Assignee: Canon Kabushiki Kaisha, Tokyo, Japan

[21] Appl. No.: 159,694

[22] Filed: Dec. 1, 1993

Related U.S. Application Data

[63] Continuation of Ser. No. 559,332, Jul. 30, 1990, abandoned.

[30] Foreign Application Priority Data

Jul. 31, 1989 [JP] Japan ................................. 1-196631

[51] Int. Cl.⁵ .......................................... G06F 3/153
[52] U.S. Cl. ................................................. 395/165
[58] Field of Search ............... 395/111, 112, 113, 162, 395/164, 165; 364/200 MS File, 900 MS File; 345/129, 130; 358/257, 280, 285

[56] References Cited

U.S. PATENT DOCUMENTS

| | | | |
|---|---|---|---|
| 3,898,627 | 8/1975 | Hooker et al. | 395/107 |
| 4,631,596 | 12/1986 | Yaguchi | 358/256 |
| 4,677,649 | 6/1987 | Kunishi et al. | 375/122 |
| 4,679,093 | 7/1987 | Yaguchi | 358/257 |
| 4,712,139 | 12/1987 | Kato | 358/257 |
| 4,717,967 | 1/1988 | Yoshida | 358/296 |
| 4,727,276 | 2/1988 | Izukawa et al. | 310/316 |
| 4,789,900 | 12/1988 | Takahashi | 358/257 |
| 4,827,349 | 5/1989 | Ogata et al. | 358/256 |
| 4,885,641 | 12/1989 | Kato | 358/296 |
| 4,907,094 | 3/1990 | Mishina et al. | 358/437 |
| 4,910,785 | 3/1990 | Nakatsuma | 382/9 |
| 4,922,349 | 5/1990 | Abe et al. | 358/443 |
| 4,933,874 | 6/1990 | Asada et al. | 364/514 |
| 5,018,081 | 5/1991 | Yamaguchi | 395/113 |
| 5,046,066 | 9/1991 | Messenger | 370/94.1 |
| 5,050,101 | 9/1991 | Kiuchi et al. | 395/107 |
| 5,062,059 | 10/1991 | Youngblood et al. | 364/521 |
| 5,062,073 | 10/1991 | Masuda et al. | 364/900 |
| 5,113,489 | 5/1992 | Cihiwsky et al. | 395/113 |
| 5,125,074 | 6/1992 | Labeaute et al. | 395/121 |

Primary Examiner—Phu K. Nguyen
Attorney, Agent, or Firm—Fitzpatrick, Cella, Harper & Scinto

[57] ABSTRACT

An image communication apparatus includes a recorder for recording image data on a page unit basis; a buffer memory for temporarily storing the image data to be recorded by the recorder; a reception unit for receiving the image data; and a controller for controlling to store the received image data or the image data to be recorded, in the buffer memory; wherein the controller selectively executes a first mode, for storing the image data to be recorded in the buffer memory or a second mode, for storing the received image data sequentially in the buffer memory.

10 Claims, 6 Drawing Sheets

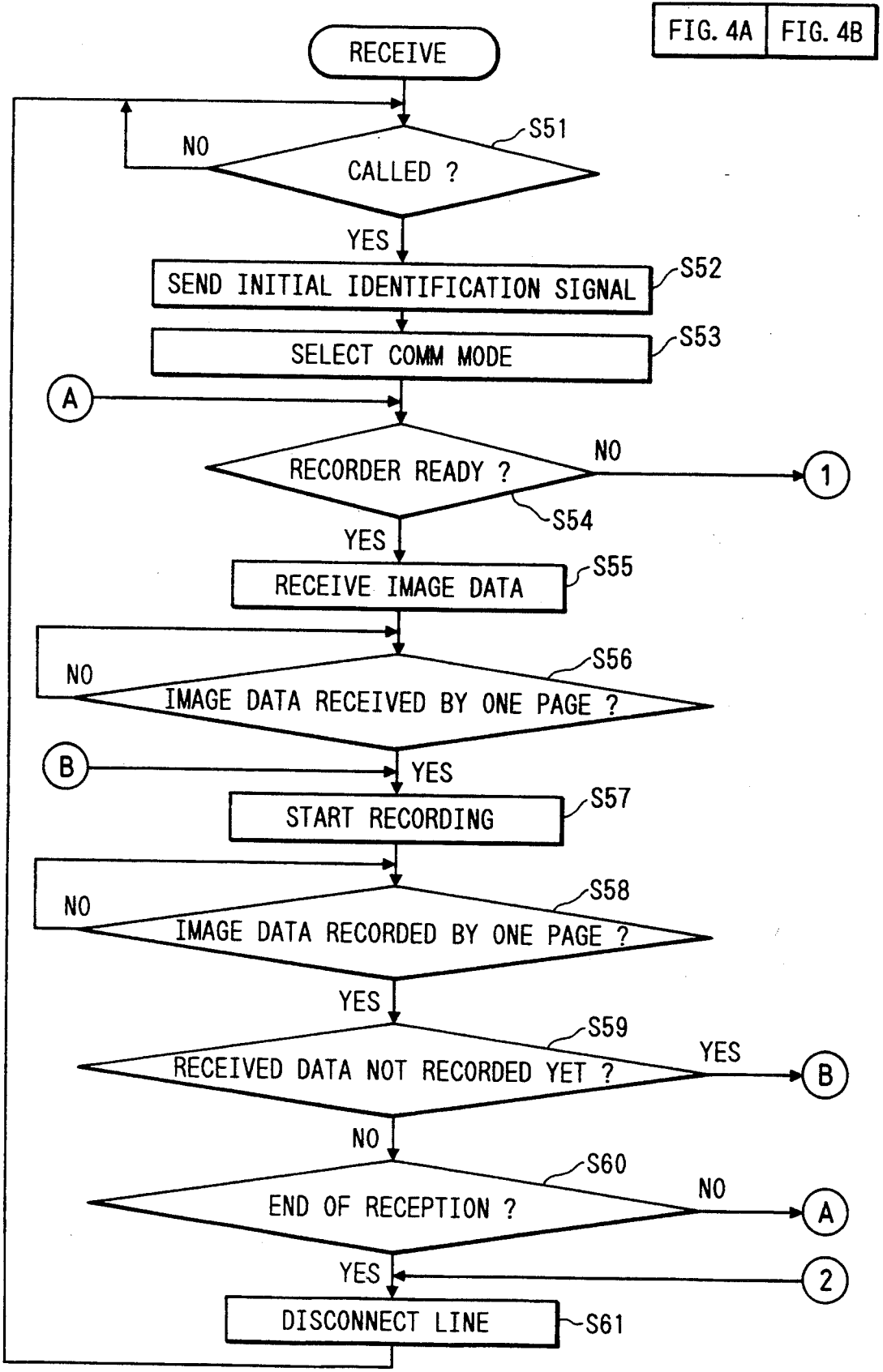

IMAGE COMMUNICATION APPARATUS

This application is a continuation of application Ser. No. 07/559,332 filed Jul. 30, 1990, abandoned.

BACKGROUND OF THE INVENTION

1. Field of the Invention

The present invention relates to an image communication apparatus having a memory for storing received image data.

2. Related Background Art

There are known facsimile apparatus of the type which uses as a recording apparatus a so-called page printer such as a laser beam printer whose recording operation is controlled in units of one page of image data. A page printer uses one page as its minimum data recording unit, the recording processing time for one line is nearly constant, and the recording operation cannot be stopped in the midst of recording one page.

Such a page printer is generally provided with a buffer memory for storing one page of image data, which is the minimum unit to be processed at a time. The buffer memory is provided because the time required for obtaining one page of image data during facsimile communication fluctuates.

If an image to be copied is read and recorded with complete synchronization between reading and recording, such a buffer memory is not necessary. However, such synchronization is not usually ensured, but image data is recorded after one page of image data is completely stored. Such a buffer memory has not been used as an image memory for storing image data of one unit of communication.

The reason for this is to allow receiving one image and simultaneously copying an original using the printer, even if image data to be transmitted is being stored in an image memory.

A page buffer used for a page printer of a facsimile apparatus is required to store typically a one page original of A4 size, the capacity thereof being relatively large. For instance, the memory capacity of about 500 k Bytes is required for storing a single A4 original binarized at a resolution of 8 pixels/mm.

The page buffer is used, however, only for recording data with a printer as described before, resulting in a poor memory efficiency.

Facsimile apparatus using such a page printer are disclosed in U.S. Pat. Nos. 4,677,649; 4,712,139; 4,679,093; 4,631,596; 4,717,967; 4,885,641; 4,827,349; 4,910,785; and 4,727,276; 4,907,094; and 4,922,349.

There is also known an apparatus which performs so-called reception-by-memory, namely, when the recording unit cannot be operated due to a deficiency of recording material such as recording paper and toner, received image data is temporarily stored in an image memory and outputted when the operation of the recording unit is recovered. Even if the recording unit cannot be operated, such an apparatus uses a page buffer for a printer and an image memory independently of each other. Therefore, the page buffer for a printer remains unused and empty until operability is recovered.

Facsimile apparatus performing reception-by-memory are disclosed in U.S. Pat. Nos. 4,717,967 and 4,789,900; and in U.S. patent applications Ser. Nos. 250,099 (filed on Sep. 28, 1988) and 446,479 (filed on Dec. 5, 1989).

Facsimile apparatus solving the above-described problems have not been proposed as yet.

SUMMARY OF THE INVENTION

In view of the above problems, the present invention aims at improving an image communication apparatus.

It is an object of the present invention to efficiently use a buffer memory for a page printer.

It is another object of the present invention to provide an image communication apparatus capable of using a buffer memory for a page printer during reception-by-memory.

It is a further object of the present invention to provide an image communication apparatus capable of using a buffer memory for a page printer for the reception-by-memory of image data.

It is an object of this invention to allow using a buffer memory for a printer for the reception-by-memory in an image communication apparatus which records image data in units of page.

The above and other objects, features and advantages of this invention will become apparent from the following detailed description of the preferred embodiments taken with the accompanying drawings.

DETAILED DESCRIPTION OF THE PREFERRED EMBODIMENTS

Figure 1:
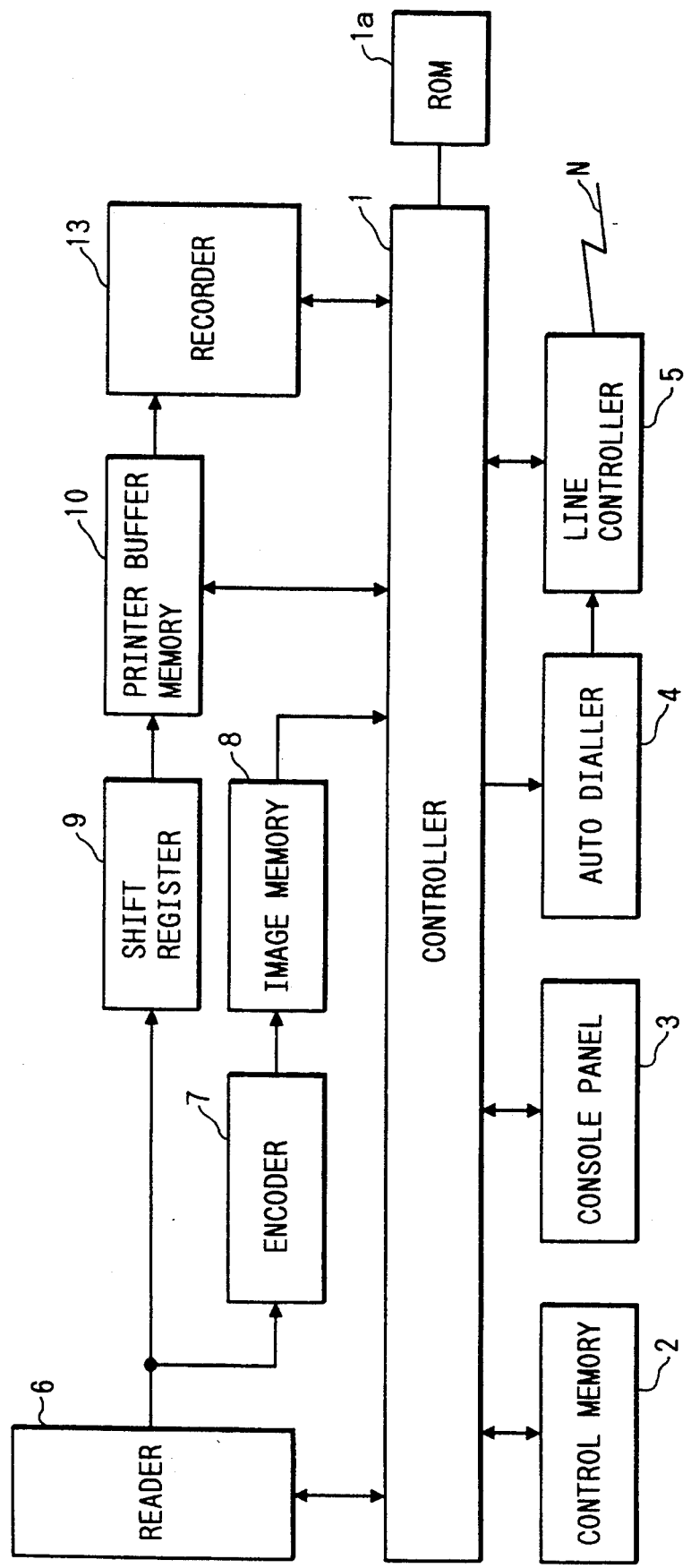
FIG. 1 is a block diagram showing the structure of a facsimile apparatus embodying the present invention.

The present invention will be described in detail in connection with the embodiments shown in the drawings.

The structure of the facsimile apparatus embodying the present invention is shown in FIG. 1. Referring to FIG. 1, a controller 1 is constructed of a microprocessor and the like. Control programs (to be described later) used by the controller 1 are stored in a ROM 1a. The controller 1 controls the operation of the apparatus, and executes decoding of received image data coded by an MH, MR, MMR or other coding scheme. This decoding processing is executed while using a control memory 2 constructed of a RAM or the like as a working area.

Inputting/outputting image data is performed by a reader 6 and a recorder 13, respectively.

The reader 6 is constructed of an optical detector such as a CCD line sensor, and an original feeding system. Binarized image data read with the reader 6 is stored in an image memory 8. In this case, image data to be transmitted is subjected to redundancy compression by an encoder 7 which encodes image data by means of an MH, MR, MMR or other scheme.

The recorder 13 is constructed of a page printer such as a laser beam printer. The recorder 13 records image data of one page at a time, and cannot stop its operation until one page is completely recorded. For such one page recording by the recorder 13, a buffer memory 10 is provided. The buffer memory 10 is constructed of a semiconductor memory and has a capacity allowing one to store the image data of a predetermined size of image (e.g., A4 size).

In a copy operation by the recorder 13 to record the image data read with the reader 6, the encoder 7 and image memory 8 are not used, but the image data serially outputted from the reader is converted into a parallel data by a shift register 9, stored in the buffer memory 10, and recorded by the recorder 13.

The recorder 13 is provided with a known recording sheet amount sensor, toner sensor and the like. These sensors check during the recording operation if the recorder 13 can continue to be operated.

A user manipulates the facsimile apparatus from a console panel 3 which is constructed of ten keys, various function keys, a display device, e.g., an LCD panel, and an alarm unit such as a buzzer.

A line N is controlled by an auto-dialer 4 and line controller 5. The auto-dialer 4 generates a selection signal to be sent from the line controller 5 in accordance with telephone number data or the like. The line controller 5 is constructed of a modem, network controller and the like, and modulates image data to be transmitted, demodulates received image data, and controls the connection of the line N.

Figure 2:
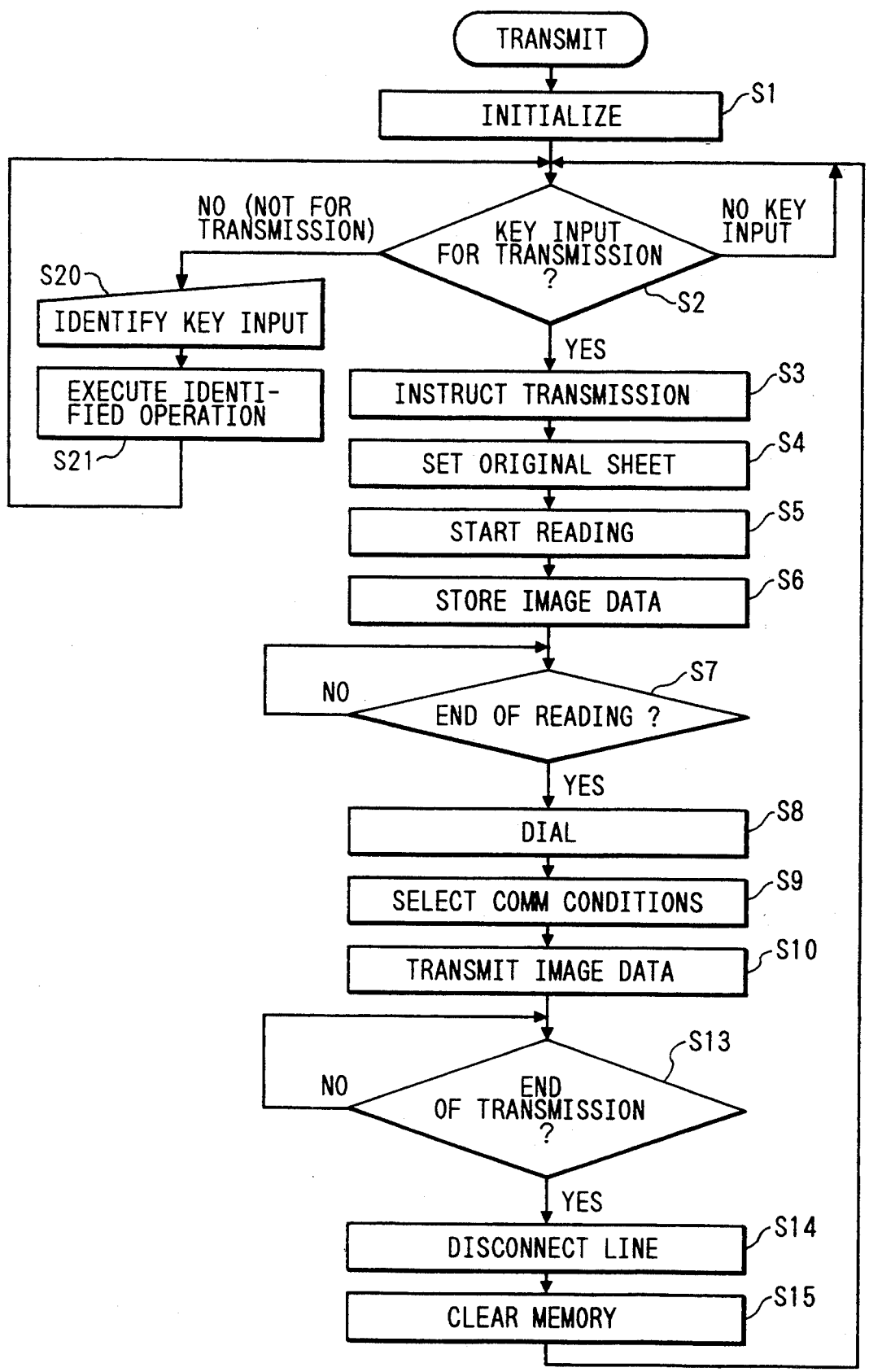
FIG. 2 is a flow chart illustrating the transmission procedure by the apparatus shown in FIG. 1.

The operation of the facsimile apparatus constructed as above will be described next. FIG. 2 illustrates the transmission control procedure by the controller 1 stored in ROM 1a.

At step S1, the controller 1 initializes various parameters used for the transmission operation. At step S2, a key input from the console panel 3 is waited. If a key input instructing a data transmission is entered, the control advances to step S3. If a key input instructing to execute another process is entered, the contents of the key input are analyzed at step S20 and the corresponding process (reception or copy operation to be described later) is executed at step S21.

At step S3, a user instructs data transmission from the console panel 3. At this step, the telephone number of a partner or the like is entered, and thereafter at step S4 an original is set on the reader 6. At step S5, the reader 6 starts reading image data on the original. At step S6, the image data is sequentially encoded by the encoder 7 and stored in the image memory 8.

It is checked at step S7 if all the original image data has been stored or not. Upon completion of reading the image data, the partner is dialed by using the auto-dialer 4.

At step S9, communication conditions such as a communication speed are set by using a known communication protocol. At step S10 the image data in the image memory 8 is transmitted. At step S13, the end of transmission is detected. Upon completion of transmission, the line controller 5 disconnects the line at step S14. At step S15 the image data stored in the image memory 8 is cleared, and the control returns to step S2.

Figure 3:
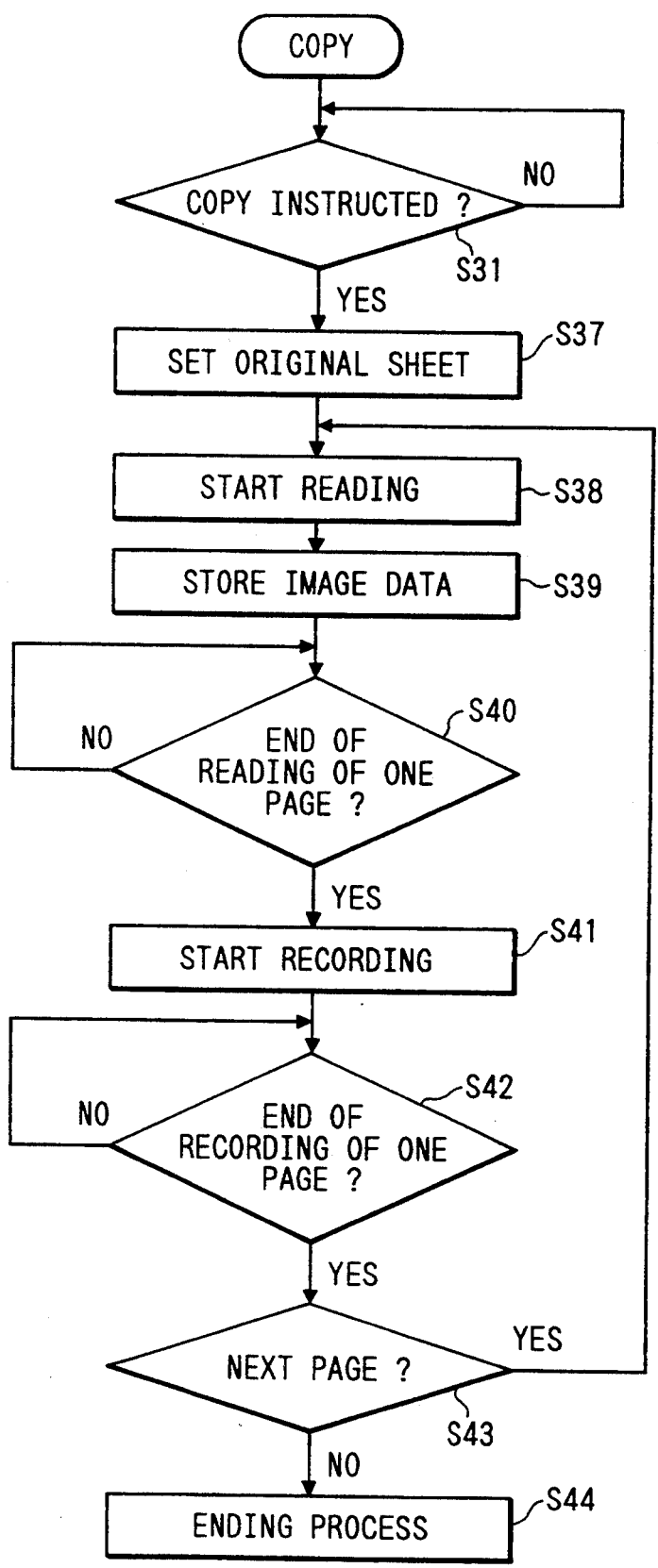
FIG. 3 is a flow chart illustrating the copy operation by the apparatus shown in FIG. 1.

FIG. 3 shows the copy control procedure by the controller 1. The term "copy" means a processing by the recorder 13 to record and output the image data read with the reader 6. At step S31, a copy instruction from the console panel 3 is a waited. Upon actuation of a predetermined key from the console panel 3 instructing a copy operation, an original to be copied is set on the reader 6 at step S37. At step S38, the reader 6 starts reading the original.

As the image data of one line unit is outputted from the reader 6 constructed of a CCD line sensor or the like, the image data is inputted to the shift register 9 which converts it into a parallel data. The parallel data are sequentially stored in the buffer memory 10 (step S39).

When it is confirmed at step S40 that one page of image data has been completely read, the one page of image data stored in the buffer memory 10 is inputted to the recorder 13 and outputted at step S41.

At step S42, the end of recording of one page by the recorder 13 is a waited. After completion recording of one page, it is checked at step S43 if the next original to be read is loaded on the recorder 6. This check is carried out, e.g., in accordance with an output from a known original sensor mounted on the recorder 6. The next original is copied by repeating the processes starting from S38.

If it is judged at step S43 that all originals have been processed, a predetermined end process such as clearing the printer buffer is executed at step S44.

Figure 4B:
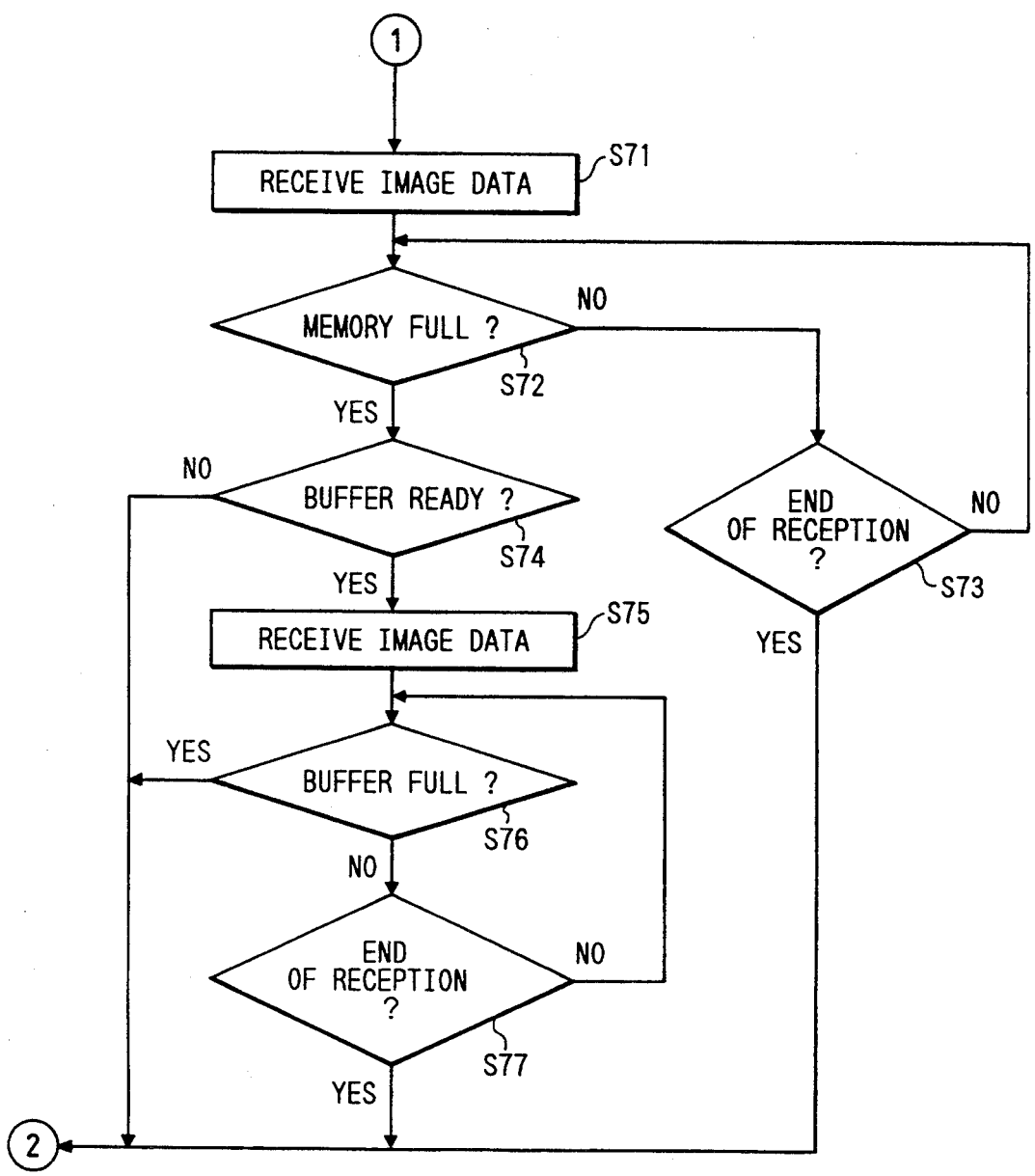
FIG. 4, consisting of FIGS. 4A and 4B, is a flow chart illustrating the reception control procedure by the apparatus shown in FIG. 1.

FIG. 4 shows the reception control procedure by the controller 1. Circled symbols A and B in FIG. 4 indicate that the flow is connected between the same A or B symbols.

At step S51 shown in FIG. 4, it is checked from an output of the line controller 5 if there is a call or not. If there is a call, a known initial identification signal stipulated in CCITT Recommendations is sent to the line at step S52. At step S53 there are determined a communication mode (communication speed, page size) and the like in accordance with a known communication protocol.

Next, it is checked at step S54 if the recorder 13 can be used. This check is carried out in accordance with outputs from sensors mounted on the recorder 13 such as a recording-sheet-amount sensor and a toner sensor.

If the recorder can be used, the image data is received at step S55 in accordance with a known protocol. In the image data reception processes at steps S55 and S56, the received image data is temporarily stored in the image memory 8, or is decoded into binary data and sequentially stored in the buffer memory 10.

At step S56 it is checked if one page of image data has been received. If one page of image data has been received, recording the image data starts at step S57. At step S57, there is a case where the image data has been stored in the buffer memory 10 in accordance with the control operation to be described later. Accordingly, if there is image data within the buffer memory 10, the image data is first recorded and outputted at the recorder 13. Thereafter, the received image data, or the received image data stored in the image memory 8, is decoded and inputted to the buffer memory 10 and recorded by the recorder 13.

At step S58 it is checked if one page of image data has been recorded by the recorder 13. If one page of image data has been recorded, it is checked at step S59 if there is any received image data not recorded yet. If the received image data not recorded yet is stored in the image memory 8, the processes starting from step S57 are repeated. After all the received image data has been recorded, the control advances to step S60.

It is checked at step S60 if the reception procedure has been completed. If not, the control returns to step S54 where it is again checked if the recorder can be used. If the reception procedure has been completed, the line is disconnected and hence the communication is terminated at step S61.

On the other hand, if it is judged at step S54 that the recorder 13 cannot be used, the reception-by-memory processes starting from step S71 are executed. First at step S71 the image data is received in accordance with a known protocol, and sequentially stored in the image memory 8.

It is checked at step S72 by means of address calculation if the image memory 8 overflows (or becomes full). Specifically, it is checked if all the succeeding one page image data can be stored in the image memory 8. If it is judged that the image memory 8 will become full, the control advances to step S74, whereas if it is judged that the image memory 8 has an ample capacity, the control advances to step S73.

At step S73 it is checked if all the image data has been received. If all the image data has been received, the control returns to step S61. If all the image data has not been received, the control returns to step S72.

At step S74 it is checked if there is any data stored in the buffer memory 10. In other words, it is checked if the buffer memory 10 can be used or not.

At the stage at step S74, the next page image data to be stored starts from the top of a page because of the process executed at step S72. If there is any data stored in the buffer memory 10 at step S74, the control proceeds to step S61. If not, the control advances to step S75 where the received one page of data is decoded and stored in the buffer memory 10.

At step S76 it is checked if the buffer memory 10 has overflowed. If this step is affirmative, the control proceeds to step S61. If negative, the control advances to step S77 to check the reception completion similar to the process at step S73. If completed, the control proceeds to step S61. If not, the control returns to step S76.

As described above, in the reception-by-memory of this embodiment, if the image memory will become full, at least one page of decoded image data is stored in the buffer memory 10. Accordingly, by using substantially the same memory capacity as in conventional devices, image data of a larger number of pages can be stored.

After the recorder 13 is allowed to be used, the image data stored in the printer buffer is first recorded and outputted, and then the image data stored in the image memory 8 is supplied via the printer buffer to the recorder 13 to record and output one page at a time.

Figure 5:
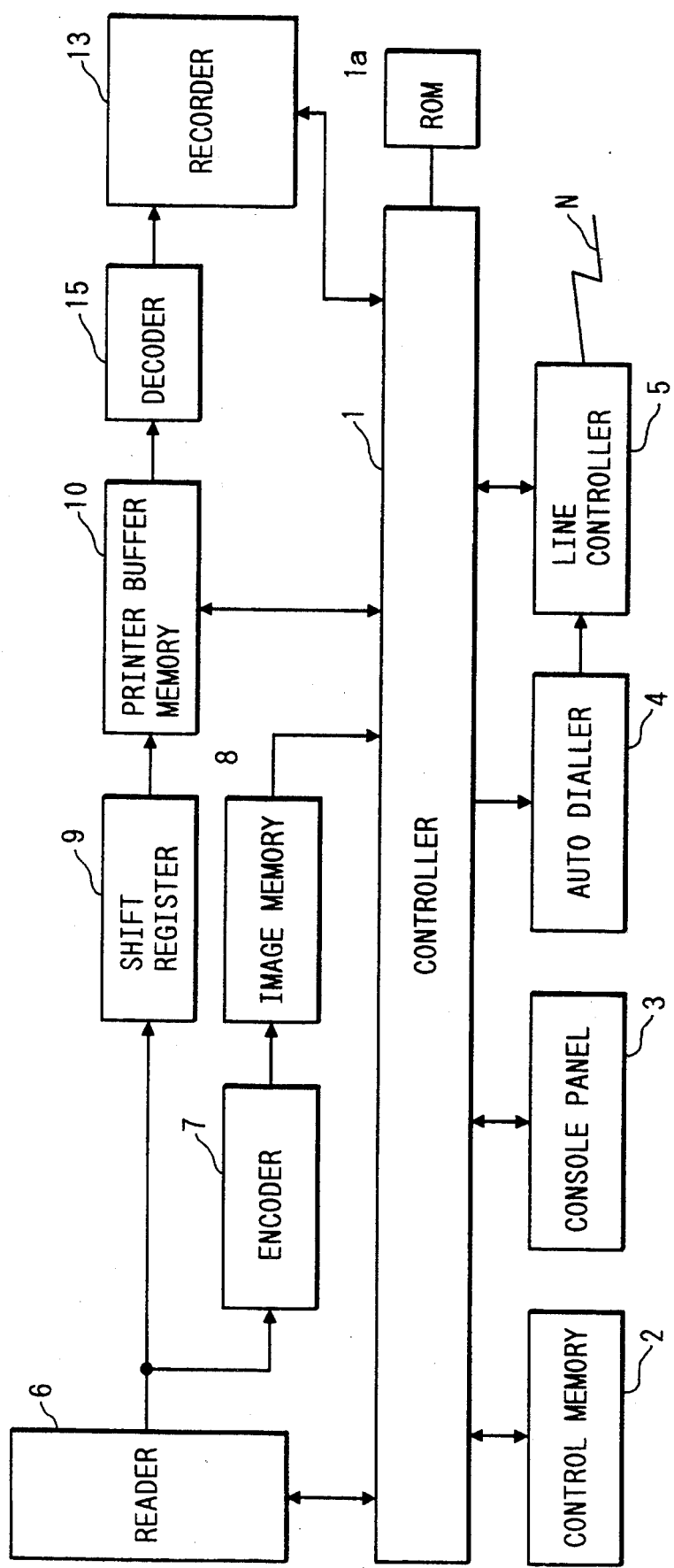
FIG. 5 is a block diagram showing the structure of another embodiment.

In the above embodiment, decoding image data has been assumed to be executed by the controller 1. A decoder 15 constructed of hardware as shown in FIG. 5 may be provided between the buffer memory 10 and the recorder 13. In this case, encoded image data itself is stored in the buffer memory 10 during reception-by-memory, and when the image data in the buffer memory 10 is flushed after the recorder becomes available, data decoded by the decoder 15 is outputted recorded.

A larger amount of image data can therefore be received by using the buffer memory 10.

The decoder 15 is not used during a copy operation, but image data not encoded is directly supplied from the buffer memory 10 to the recorder 13.

The decoder 15 in the above modification may be constructed by software of the controller 1.

In the above embodiments, the image memory 8 and buffer memory 10 have been described as physically separated. It is obvious that these two memories may be constructed of a single memory which is controlled by allocating specific addresses to respective two memories. This invention is also applicable to other types of image communication apparatus irrespective of different resolutions of images, different recording paper sizes, different communication schemes, and the like.

The present invention is not limited to the above embodiments, but various modifications are possible.

What is claimed is:

1. An image communication apparatus comprising:
   receiving means for receiving image data;
   an image memory for storing the image data received by said receiving means;
   a buffer memory for temporarily storing received image data of one page or more read out from said image memory;
   recording means for recording received image data read out from said buffer memory, for each page;
   detecting means for detecting whether or not said recording means is capable of recording the received image data; and
   control means for controlling storage of the received image data in said image memory and said buffer memory, in accordance with a detection result obtained by said detecting means,
   wherein, when said recording means is incapable of recording the received image data, said control means discriminates whether available memory capacity of said image memory has reached a predetermined amount, and causes said buffer memory to store therein the received image data of said image memory in accordance with a result of such discrimination.

2. An image communication apparatus according to claim 1, wherein said buffer memory stores image data without processing of that image data before storage.

3. An image communication apparatus according to claim 1, wherein said buffer memory stores image data encoded by a predetermined encoding scheme.

4. An image communication apparatus according to claim 1, further comprising means for reading an image, said buffer memory storing image data read by said reading means.

5. An image communication apparatus according to claim 1, wherein said control means discriminates whether or not unrecorded image data is stored in said buffer memory when the image data of said image memory is to be recorded, and if unrecorded image data is stored in said buffer memory, said control means causes said recording means to record the unrecorded image data and thereafter record the image data of said image memory provided through said buffer memory.

6. An apparatus according to claim 1 further comprising decoding means for decoding image data being encoded, wherein said decoding means decodes the received image data read out from said image memory and said control means stores the thus decoded image data in said buffer memory.

7. An image communication apparatus comprising:
   reading means for reading an image;
   receiving means for receiving image data;
   recording means for recording image data on a page unit basis;
   a buffer memory for temporarily storing any image data to be recorded by said recording means;
   control means for controlling storage in said buffer memory,
   wherein said control means operates in a first mode, in which any image data stored in said buffer memory is non-compressed image data, and in a second mode, in which any image data stored in said buffer memory is image data which has been encoded and compressed by a predetermined encoding scheme.

8. An image communication apparatus according to claim 7, wherein, in recording image data read with said reading means, said read image data is stored in said buffer memory using said first mode.

9. An image communication apparatus according to claim 7, wherein said second image data is stored in said buffer memory in said second mode.

10. An image communication apparatus according to claim 9, further comprising means for decoding said image data stored in said buffer memory and outputting said decoded image data to said recording means.

* * * * *

UNITED STATES PATENT AND TRADEMARK OFFICE
CERTIFICATE OF CORRECTION

PATENT NO. : 5,353,406
DATED : October 4, 1994
INVENTOR(S) : MAKOTO MIKUNI

It is certified that error appears in the above-identified patent and that said Letters Patent is hereby corrected as shown below:

ON TITLE PAGE

In [57] ABSTRACT, Line 5, "to store" should read --storage of--.

IN THE DRAWINGS

Sheet 1 of 6, "DIALLER" should read --DIALER--.
Sheet 6 of 6, "DIALLER" should read --DIALER--.

COLUMN 1

Line 13, "are" should read --is--.
Line 51, "and" (first occurrence) should be deleted.

COLUMN 3

Line 33, "waited" should read --awaited--.
Line 64, "a waited." should read --awaited.--.

COLUMN 4

Line 12, "a waited." should read --awaited.--.

COLUMN 6

Line 51, "claim 1" should read --claim 1,--.

UNITED STATES PATENT AND TRADEMARK OFFICE
CERTIFICATE OF CORRECTION

PATENT NO. : 5,353,406
DATED : October 4, 1994
INVENTOR(S) : MAKOTO MIKUNI

It is certified that error appears in the above-identified patent and that said Letters Patent is hereby corrected as shown below:

<u>COLUMN 8</u>

Line 1, "said second" should read --said received--.

Signed and Sealed this

Eleventh Day of April, 1995

*Attest:*

BRUCE LEHMAN

*Attesting Officer*     *Commissioner of Patents and Trademarks*